July 15, 1958 G. U. BRUMBAUGH 2,843,395
REAR END SUSPENSION
Filed Aug. 29, 1956 3 Sheets-Sheet 3
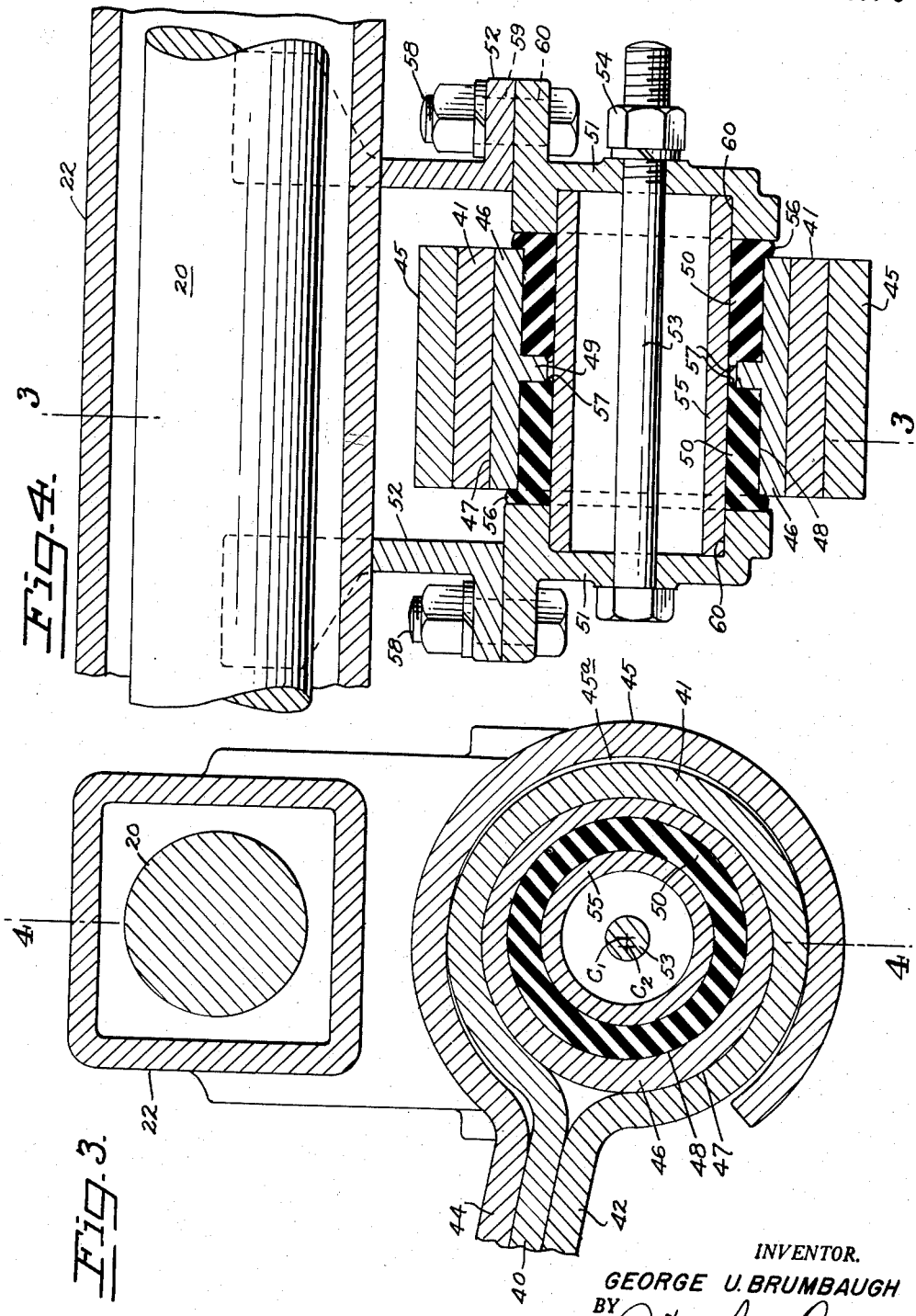
INVENTOR.
GEORGE U. BRUMBAUGH
BY
ATTORNEY

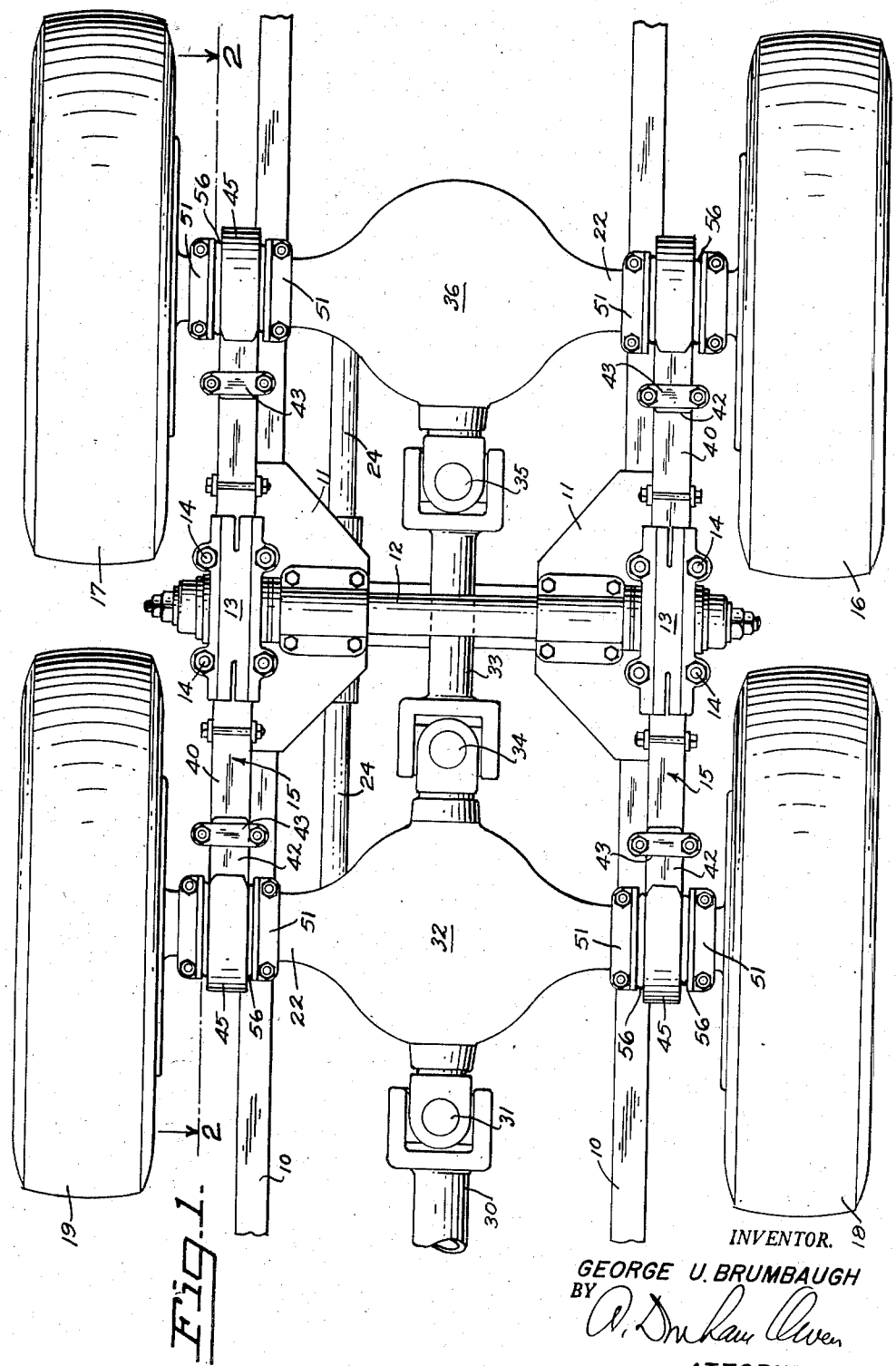

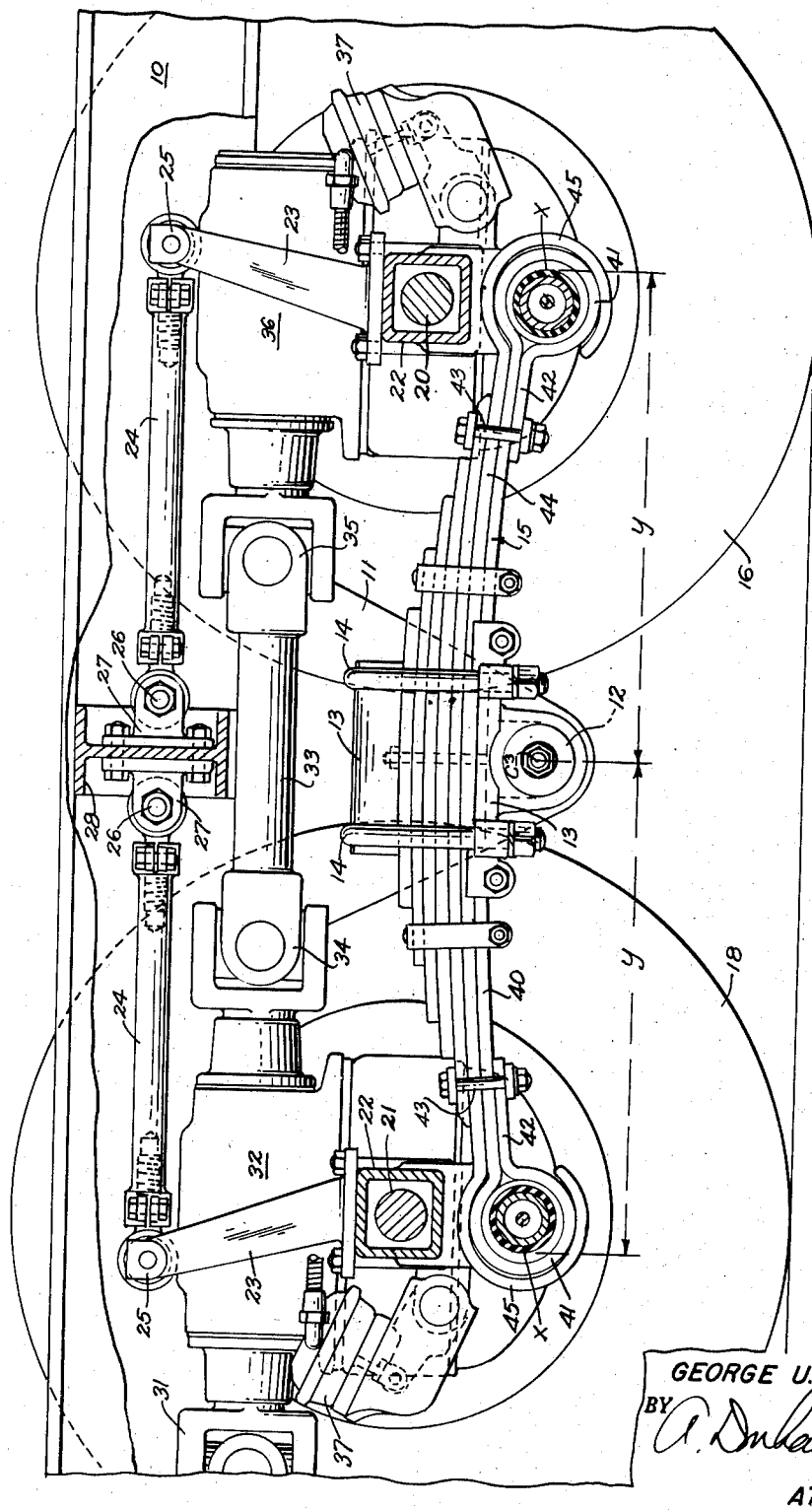

United States Patent Office 2,843,395
Patented July 15, 1958

2,843,395

REAR END SUSPENSION

George U. Brumbaugh, Palo Alto, Calif., assignor to Peterbilt Motors Company, Oakland, Calif., a corporation of California Application August 29, 1956, Serial No. 606,890

4 Claims. (Cl. 280—104.5)

This invention relates to improvements in tandem bogies. More particularly, it relates to spring-mounting, spring-cushioning, and aligning means for the two axles of a four-wheel unit such as is used in six-wheeled heavy trucks and the like.

By eliminating the lower torque rods from tandem bogies and utilizing the springs not only as load-carrying members and for governing the transverse steering forces, but also as a positioning means for the fore-and-aft resistance to braking loads and driving torque, a significant reduction in weight can be achieved. An example of this advanced prior-art structure is shown in the patent to J. W. Heiney, No. 2,437,158. Even so, and in spite of the advantages gained by this structure, its use has been limited by certain problems that have long remained unsolved, and it is an important object of the present invention to solve these problems.

For example, Heiney connects the ends of his springs to the axles through a pair of rubber cushions compressed between a casing secured to the axle housing and metal shoes attached to the springs. This structure appears to give satisfactory results so far as resistance to vertical movement is concerned. However, braking torque and driving torque exert fore-and-aft forces that the Heiney device simply cannot handle properly because his rubber cushions have to take these forces in shear instead of compression. In other words, all that resists these fore-and-aft forces at the connection between the springs and the axles is the shear in the cushions. Such a shear "sandwich" has a relatively low shear—about one-sixth that of the spring rate in compression. A device of this kind with a satisfactory spring rate in shear would have a greatly excessive rate in compression. Another result is that a sudden application of a strong fore-and-aft force could break the connection and send the heavy vehicle into a ditch. Heiney therefore had to provide a T-shaped stop bar hinged to the outer end of the springs and extending through a slot in the casing to restrain the longitudinal movement of the springs.

One of the main objects of this invention is to solve this problem and to provide for adequate resistance of forces transverse to the axles, no matter which direction they come from. The present invention accomplishes this object by a novel combination in which each end of the bottom leaf of each spring is provided with an integral cylindrical eye. Secured in this eye is a bushing assembly that includes a cylindrical rubber bushing able to respond equally to forces from all directions and to absorb equally the vertical and the fore-and-aft movements. The direct cooperation between the round spring eyes and the cylindrical rubber bushings provides all the spring restraint needed, and for the first time in this field gives adequate portection against sudden movement resulting from braking or driving torque.

Another problem in this type of tandem bogie mounting has been caused by the differences in spring length due to manufacturing tolerances. Even differences of as little as a sixteenth of an inch can cause trouble, and often the differences are greater. Since the springs in this type of mounting are used to position the axles, they also determine alignment of the wheels, and differences in spring length resulted in the axles not being parallel to each other or to the axis of the trunnion that connects the tandem bogie to the frame of the truck. The wheels were therefore misaligned, and tire scrub resulted, so that the tires were rapidly worn out. In aggravated cases the drive shaft was also vibrated, but this was a much less common problem.

The present invention solves this difficult problem by another novel feature of the bushing assembly that fits into the spring eye. Between each spring eye and each cylindrical rubber bushing is a tubular metal bushing. The center line of the outer periphery of the metal bushing is parallel to but offset from the center line of its inner periphery. This eccentricity is used to counteract the differences in spring length, simply by rotating the metal bushings in the various spring eyes until the centers of all the bushing inner peripheries lie at the same distance from the center line of the trunnion. The bushing is then clamped against further rotation. This novel feature of adjustability makes it possible for the first time to obtain and maintain accurate and true wheel alignment in tandem bogies of the type where the springs are used as positioning members.

Other objects and advantages will appear from the following description of a preferred embodiment of the invention.

In the drawings:

Fig. 1 is a bottom plan view, looking at a tandem bogie embodying the principles of the present invention with the frame and drive-shaft being broken off in order not to have to show the remainder of the truck.

Fig. 2 is a view in side elevation and in section, taken along the line 2—2 of Fig. 1, with portions of the frame broken away to show the parts behind it.

Fig. 3 is an enlarged view of a portion of Fig. 2, showing the axle housing and its connection to the spring-eye and bushing. This view may also be considered as taken in section along the line 3—3 of Fig. 4.

Fig. 4 is a view in section taken along the line 4—4 in Fig. 3.

As shown in Figs. 1 and 2, a vehicle frame 10 is provided with a pair of pedestal brackets 11, 11 in which a tubular trunnion 12 is journaled or, preferably, fixed, as in conventional bogies. By means of a spring-seat or saddle 13 and a pair of U-bolts 14, each end of the trunnion 12 supports a spring 15. The two springs 15, through the trunnion 12, support the vehicle frame 10 on four wheels 16, 17, 18, and 19, axles 20 and 21 and axle housings 22. This connection is positioned by torque arms 23 secured rigidly to the axle housings 22 and by a pair of upper torque rods 24 pivotally secured at 25 to the arms 23 and pivotally secured at 26 to a bracket 27 on a frame cross-member 28. By providing right and left hand threading connections at the two ends of each torque rod 24, it is possible to adjust the effective length of the torque rods to provide a parallelogram or other desired structure that transmits brake torque and driving torque from the axles to the frame structure and prevents weight transfer from one axle to the other.

A vehicle drive shaft 30 may be connected through a first universal joint 31 to a first rear end 32, which, in turn, is connected to a short driveshaft member 33 through a second universal joint 34. The opposite end of the shaft 33 is connected through a third universal joint 35 to a second rear end 36. Instead of this structure either or both axles 20, 21 may be dead, or non-driving. For example, both would be non-driving in a trailer. In addition, the usual brake structure 37 may be mounted in the conventional manner.

The present invention is concerned principally with a novel connection between the spring 15 and the axles 20, 21. In this combination, the bottom leaf 40 of the spring 15 is provided at each outer end with a generally cylindrical eye 41, a finial portion 42 being brought back under the leaf 40 and clamped to it by suitable means, such as a bolt-clamp assembly 43. Also, the spring leaf 44 just above the bottom spring leaf 40 is provided at its outer ends with an arcuate portion 45 that preferably encircles approximately three-quarters of the eye 41, as a safety measure, to preclude loss of control in the event of eye breakage, clearance 45a being left between the arcuate portion 45 and the eye 41, sufficient to permit relative movement of these portions during flexure of the spring 15.

Turning especially to Figs. 3 and 4, where the eye 41 and associated parts are shown on a larger scale, it will be seen that a metal bushing member 46 fits snugly with its outer periphery 47 against the eye 41. Its inner periphery 48 is eccentric to the outer periphery 47. In other words, these cylindrical surfaces have different axes shown at $C_1$ and $C_2$ in Fig. 3, parallel to each other but offset, preferably about 1/8 inch apart to enable accommodation of spring manufacturing tolerances up to about 1/4 inch. The bushing 46 is also provided with a radially inwardly extending generally central annular stop 49, against which two identical cylindrical rubber bushings 50 are urged by a pair of hanging brackets 51, 51. The brackets 51, 51 are bolted to a lower portion 52 of the axle housing 22, and they are forced toward each other by a through-bolt 53 provided with a suitable nut 54 that bears against the outer surfaces of the brackets 51. A cylindrical metal sleeve 55 concentric with the inner periphery 48 of the metal bushing member 46 is also supported between the brackets 51, 51 and fits snugly in cylindrical recesses 60. When the nut 54 is tightened, the rubber bushings 50, 50 are tightly compressed, and the rubber is flowed to provide a tight connection between the sleeve 55 and the bushing 46—tight, that is, as to axial and radial motions but relatively free as to rotational forces.

It will be seen from Figs. 3 and 4 that the rubber bushings 50, 50 provide for a snug yet resilient connection between the axles 20, 21 and the spring 15 and, since it is cylindrical, it will be seen that it is under compression both vertically and fore-and-aft and, in fact, in any direction normal to the axle. This enables this novel structure to accommodate the fore-and-aft forces produced by driving torque and braking torque, easily and adequately, whereas they could not do this if they were under shear instead of compression. In addition, rotation upon articulation can be accomplished without distortion or change in the relative positions between the spring end center and the axle bracket center, because of the symmetry of the rubber bushing 50 about its axis. Furthermore, it will be noted that since the outer periphery 47 of the metal bushing 46 is eccentric to the inner periphery 48, it is possible, by locating the bushing 46 in different rotational positions, to effect differences in alignment of the axle 20 and the trunnion 12.

In installation, once the springs 15 and trunnion 12 have been assembled to the frame 10, as shown, the metal bushing 46 is inserted in each spring-eye 41. Using a tape measure or other convenient apparatus, the mechanic then measures the distance Y between the center line or axis $C_3$ of the trunnion 12 and the point X on the inner periphery 47 of each bushing 46 farthest from the trunnion 12. By rotating one or more of the bushings 46, he can equalize the distance Y so that all four are identical. Thus, if a spring 15 is longer on one end and shorter on another, and even if the two springs 15 are different lengths from each other due to manufacturing tolerances, the quarter-inch of eccentricity enabled by the eighth-inch offset in bushing peripheral axes $C_1$ and $C_2$ enables him to adjust until all four of the bushings are so located that their centers $C_1$ are actually at the same distance from the trunnion axis $C_3$.

This having been achieved, the mechanic next inserts the sleeve 55 loosely into the inner periphery of the bushing 46. Next, the rubber bushings 50 are inserted from opposite ends of the sleeve 55 and pushed in to abut against the stop ring 49. It is easy to insert the bushings 50 between the sleeve 55 and bushing 46, because the rubber bushings 50 are made to have a loose fit before they are compressed. When this step has been completed, the hanging brackets 51 are put in place and the through-bolt 53 and nut 54 used to tighten them. When they are tight, the rubber bushings 50 will be compressed and bulged out at 56 and 57, and will fill, solidly but resiliently, the space between the inner bushing periphery 48 and the sleeve 55. The brackets 51 are tight against the ends of the sleeve 55. Then bolts 58 can be inserted through openings 59 and 61, which are now aligned for securing the brackets 51, 51 to the portion 52 of the axle housing 22. The axle housing 22 is thereby secured to the spring-eye 41 and, therefore, to the spring 15. The axle housings 22, having previously been made with careful attention to proper alignment of the axles 20 and 21, this results in automatic alignment of the axles 20 and 21 so that their axes are parallel to the axis of the trunnion 12.

The torque rods 24 are then installed and adjusted for length, the proper length being indicated by any suitable means, such as a spirit level on the axles 20, 21. The worm or pinion shafts for the wheel drives are then properly positioned to each other, and the assembly is complete.

In operation, the wheels 16, 17, 18, 19 retain their proper alignment as determined by the springs 15 and bushings 46, and therefore the tires wear evenly. The vertical forces of load and road unevenness are resisted through the rubber bushings 50 and springs 15, and the fore-and-aft forces due to driving and braking torque are equally well resolved, due to the cylindrical shape of the bushing 50, the bushing 46, and the sleeve 15. In fact, this device is safe even if through some unforeseen event the rubber bushings 50 were to split and come out, in contrast to previous devices where such a happening would cause wrecks.

Also the rubber bushings 50 have sufficient resilience to accommodate all the various angular displacements required when the bogie is articulated, as over rough ground, while still retaining the proper relationship of the axles 20, 21 to the trunnion 12.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A spring-cushioning unit including a spring leaf having a cylindrical eye at its end, a metal bushing fitting snugly in said eye and having an inner periphery eccentric to its outer periphery, to accommodate spring manufacturing tolerances by its rotational position in said eye; a hollow casing having end portions lying at opposite ends of said eye and said bushing and having a central cylindrical member extending between them through said bushing and spaced apart therefrom, and cylindrical rubber bushing means filling the space between said bushing and said cylindrical member, and under compression between the end members of said housing.

2. A vehicle spring-cushioning unit including a leaf spring one leaf of which has a cylindrical eye at each end; a metal bushing in each eye having its outer periphery snug in said eye and its inner periphery eccentric thereto, so that rotation in said eye changes the effective length of said spring leaf; a rubber bushing in each metal bushing; a cylindrical member inside said rubber bushing so that said rubber bushing fills the space between said cylindrical member and said metal bushing, said cylindrical member extending beyond the ends of said eye and said metal bushing; and casing means axially compressing opposite ends of said rubber bushing.

3. In a vehicle tandem bogie suspension having a vehicle frame, a trunnion journaled therein transversely of said vehicle, a pair of leaf springs, one on each side of said vehicle, supported at their centers by opposite ends of said trunnion, a pair of axles parallel to said trunnion, and axle housings for said axles, the combination therewith of a connection between said axle housings and said springs comprising: a bottom spring leaf in each spring having a cylindrical eye at each outer end as an integral portion thereof; a metal bushing for each eye, having an outer periphery fitting snugly in said eye and having an inner periphery whose center is offset from the center of said outer periphery; a metal sleeve concentric to and within said inner periphery; annular cylindrical resilient bushing means filling the space between said bushing inner periphery and said sleeve and under compression between them; casing means at opposite ends of said cylindrical resilient bushing means and supported by end portions of said metal sleeve and urged toward each other so as to axially compress said cylindrical resilient bushing means, said casing means being rigidly connected to said axle housings; whereby differences in length of said springs caused by manufacturing tolerances can be compensated for by the rotational position of said metal bushings in said eyes, and whereby said cylindrical resilient bushing means is under compression and resists forces transverse to said axles in all directions.

4. In a vehicle tandem bogie suspension having a vehicle frame, a trunnion journaled therein transversely of said vehicle, a pair of leaf springs, one on each side of said vehicle, supported at their centers by opposite ends of said trunnion, a pair of axles parallel to said trunnion, and axle housings for said axles, the combination therewith of a connection between said axle housings and said springs comprising: a bottom spring leaf in each spring having a cylindrical eye at each outer end as an integral portion thereof with a finial portion of said leaf clamped to the lower surface of the leaf inboard of said eye; a next-to-the-bottom spring leaf having an arcuate portion extending around most of said eye; a metal bushing for each eye, having an outer periphery fitting snugly in said eye, an inner periphery whose center is offset from the center of said outer periphery, and an axially central, radially inwardly extending annular stop portion; a metal sleeve concentric to and within said inner periphery; a pair of annular cylindrical rubber bushings filling the space between said bushing inner periphery and said sleeve and under compression between them, one end of each rubber bushing abutting said annular stop portion, the other end of each rubber bushing extending axially beyond said eye and said metal bushing; and a pair of casing means rigidly connected to said axle housings and bearing against the axially extending portions of said rubber bushings, and each having a recess snugly receiving end portions of said metal sleeve; means urging said casing means toward each other so as to axially compress said cylindrical resilient bushing means; whereby differences in length of said springs caused by manufacturing tolerances can be compensated for by the rotational position of said metal bushings in said eyes, and whereby said cylindrical resilient bushing means resists forces transverse to said axles in all directions.

References Cited in the file of this patent
UNITED STATES PATENTS

| | | |
|---|---|---|
| Re. 17,136 | Harris | Nov. 13, 1928 |
| 1,607,205 | Lord | Nov. 16, 1926 |
| 1,913,698 | Clement | June 13, 1933 |
| 2,437,158 | Heiney | Mar. 2, 1948 |

FOREIGN PATENTS

| | | |
|---|---|---|
| 711,567 | France | Sept. 12, 1931 |